G. Q. LEWIS.
FRICTION SHOCK ABSORBING MECHANISM.
APPLICATION FILED MAY 26, 1920.
1,403,175.
Patented Jan. 10, 1922.
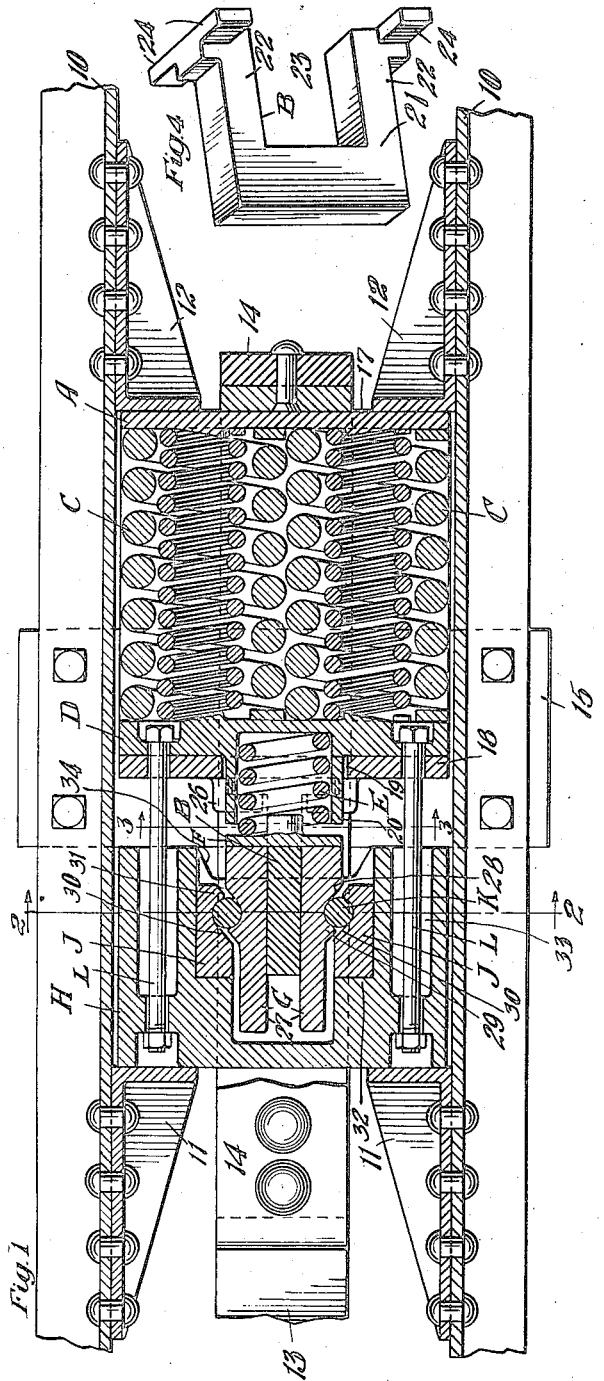
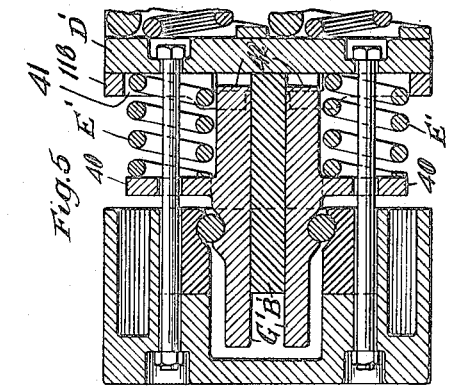
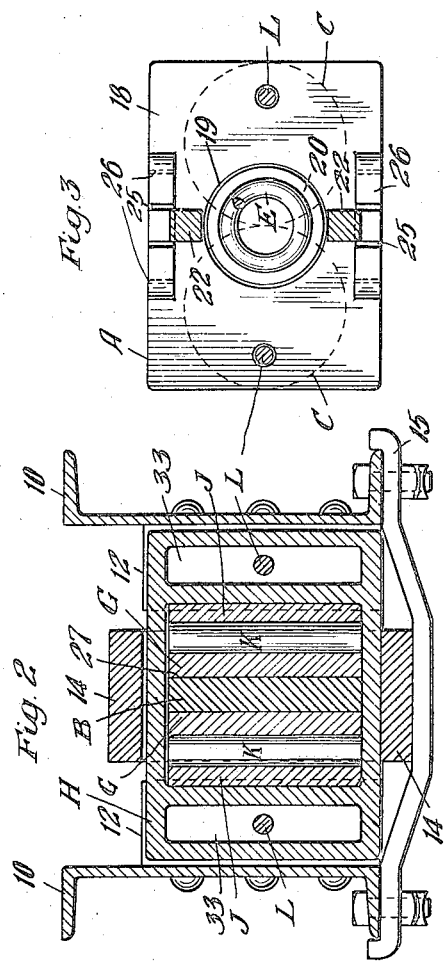
Witnesses
Wm. Geiger
Una C. Grigsby
Inventor
Goodrich Q. Lewis
By Geo. I. Haight
His Atty.

UNITED STATES PATENT OFFICE.

GOODRICH Q. LEWIS, OF WHEATON, ILLINOIS, ASSIGNOR TO WILLIAM H. MINER, OF CHAZY, NEW YORK.

FRICTION SHOCK-ABSORBING MECHANISM.

1,403,175.    Specification of Letters Patent.    Patented Jan. 10, 1922.

Application filed May 26, 1920. Serial No. 384,460.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is employed a central friction stem or post with which cooperate friction shoes compressed thereagainst.

More specifically, the object of my invention is to provide a friction shock absorbing mechanism employing a friction stem or post wherein the stem or post may be readily renewed at minimum expense.

In the drawing forming a part of this specification, Figure 1 is a horizontal longitudinal sectional view of a portion of a railway draft rigging, showing my improvements in connection therewith. Figure 2 is a vertical transverse sectional view corresponding substantially to the line 2—2 of Figure 1. Figure 3 is a transverse vertical sectional view corresponding substantially to the line 3—3 of Figure 1. Figure 4 is a detail perspective of the friction post or stem, detached. And Figure 5 is a broken view corresponding substantially to Figure 1 illustrating another embodiment of the invention.

In said drawing and referring to Figures 1 to 4, 10—10 denote channel shaped center or draft sills of a railway car to the inner faces of which are secured front stop lugs 11 and rear stop lugs 12. A portion of a drawbar is indicated at 13 to which is riveted a yoke 14 of well known form. The parts are adapted to be supported by a detachable saddle plate 15.

The improved shock absorbing mechanism, as shown, comprises, broadly, a spring casing or cage A; a detachable friction stem or post B mounted on the cage; twin arranged main springs C—C; a main spring follower D; a preliminary spring E; a preliminary spring follower F; a pair of friction shoes G—G; a follower case H; wedges J—J; anti-friction rollers K—K; and retainer bolts L—L.

The spring cage A, as shown, has horizontal top and bottom walls united by rear integral wall 17, and front wall 18, the general form of the cage being that of a hollow box with the sides open so as to permit the insertion, laterally, of the twin arranged main springs C—C and also the follower D. The front wall 18 of the cage is formed with a centrally located circular opening 19 through which is adapted to extend an annular flange 20 formed on the front face of the main follower D. As shown in Figure 1, the follower D normally bears against the inner side of the front wall 18 of the cage. The annular flange 20 in conjunction with a cut-out portion of the follower D, forms a pocket to accommodate the relatively light preliminary spring E and normally the preliminary spring follower F is slightly spaced from the forward edge of the annular flange 20 a distance corresponding to the desired preliminary spring action.

The friction stem or post B is shown in the form of a flat plate 21 which is cut away for a limited distance as indicated at 23, thereby forming two legs 22—22. Each of said legs is provided with oppositely extended flanges 24—24 so as to form a T-section with the cross members of the T extending at right angles to the general plane of the plate section. The T-sections thus formed are adapted to enter correspondingly shaped openings 25 formed in extensions 26 on the outer side of the front wall 18, said extensions 26 being located above and below the opening 19 as indicated in Figure 3. With this construction, it is evident that the friction post B can be assembled with and rigidly attached to the spring cage by sliding the post transversely of the front wall of the cage. The post is maintained in assembled relation with the cage by reason of the annular flange 20 which works within the recess 23 so that the post or stem cannot move transversely, that is, up and down as viewed in Figure 3, of the spring cage, so long as the follower D is in place. Each of the friction shoes G is formed with an inner flat friction surface 27 adapted to cooperate with the opposed surface of the friction post. On its outer side, each shoe G is further provided with a wedge surface 28 and a roll seat or shoulder 29. The wedges J are correspondingly formed with wedge surfaces 30 opposed to and parallel with the wedge surface 28, the anti-friction rollers G being interposed therebetween. The wedges J are also formed with roll seats or shoulders 31 arranged opposite the shoulders 29 of the shoes.

The front follower cage H is of rectangular outline and is cut away on its interior so as to form shoulders 32—32 for the wedges J to bear against in such manner that, as the follower cage is moved relatively to the stem, the wedges J will travel in unison with the follower cage. By making the wedges separate from or independent of the follower cage H, renewal of the wedges is facilitated and the expense minimized. The follower cage H is suitably cored as indicated at 33 to save metal and promote lightness.

The rear or inner edge of the follower cage H is adapted to engage the front wall 18 of the spring cage at the end of the compressive stroke and in order to clear the lugs 26 on the spring cage, the rear edge of the follower cage H may be cut out as indicated at 34.

The retainer bolts L pass through suitably alined perforations in the follower D, front wall 18 of the spring cage, and follower cage H. Said bolts not only hold the parts in assembled relation but may be utilized to place the preliminary spring under an initial compression.

In operation and assuming a buffing movement, it is evident that the follower cage H will move toward the spring cage A and thereby force the shoes G in the same direction, the wedges J exerting an inwardly compressive action on the shoes G so that the latter firmly grip the post B as the shoes slide thereon. The shoes actuate the follower F and the first part of the compressive stroke takes place under the resistance of the preliminary spring E until the follower F engages the annular flange 20. Thereafter the movement of the shoes with respect to the post is resisted by the main springs C. During the compressive stroke, the wedges J will shift longitudinally slightly with respect to the shoes G and upon removal of the actuating force, the anti-friction rollers K permit the instantaneous movement of the wedges with respect to the shoes in the reverse direction, thereby relieving the wedge pressure on the shoes and insuring certain release or return of the parts to normal position.

In the construction shown in Figure 5, the arrangement is broadly the same as that illustrated in the other four figures except that a pair of preliminary springs E' is employed on opposite sides of the central detachable friction post or stem B'. Said preliminary springs E' are interposed between the main spring follower D' and flanges 40 formed on the outer sides of the friction shoes G', it being noted that the front wall 118 of the spring cage is recessed as indicated at 41 where the preliminary springs pass through to engage the follower D'. In this construction, the rear ends 42 of the shoes G' are spaced from the follower D' a distance corresponding to the desired preliminary action, the shoes G' directly actuating the follower D' after the preliminary springs E' have been compressed. The method of attaching the friction post B' with the spring cage is the same as that employed in the construction of Figures 1 to 4 and the arrangement of anti-friction rollers, wedges and follower cage are also substantially the same.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a spring cage of hollow rectangular form having top and bottom walls and integral front and rear end walls; of twin arranged springs within said cage; a spring follower within said cage interposed between one set of ends of said springs and the corresponding adjacent end wall of the cage; a friction post on the outer side of and rigid with respect to said last mentioned end wall; friction-shoes cooperable with said friction post and always disposed exteriorly of the cage; a combined wedge follower cooperable with said shoes, said wedge follower being movable toward and from said cage and adapted to engage the latter to limit the compression stroke of the mechanism; means for holding said wedge follower in assembled relation with the cage; and means for transmitting pressure from said shoes to said spring follower on the inner side of the cage.

2. In a friction shock absorbing mechanism, the combination with a spring cage having an end wall; of a friction post detachably secured to said end wall of the cage and on the outer side of the latter; friction shoes cooperable with said post always on the outer side of said end wall; wedging means on the outer side of said end wall cooperable with said shoes; a spring resistance within the cage; and means for transmitting pressure between said shoes on the outer side of said end wall and spring means on the opposite side thereof.

3. In a friction shock absorbing mechanism, the combination with a spring cage; of a main spring resistance within said cage; a main spring follower; a friction post detachably secured to said cage, said post being cut away adjacent the cage; friction shoes cooperable with said post; wedging means cooperable with said shoes; and preliminary spring means located within said cut-away portion of the post and interposed between said shoes and said follower.

4. In a friction shock absorbing mechanism, the combination with a substantially hollow rectangular box-like spring cage having spaced top and bottom walls and front and rear end walls; of a friction post detachably secured to one of said end walls of the cage on the exterior thereof; spring means within the cage; friction shoes cooperable with said post on the exterior of the cage; wedging means cooperable with said shoes; and means for transmitting pressure from the shoes to the spring means within the cage.

5. In a friction shock absorbing mechanism, the combination with a spring cage having front and rear walls, one of said walls having a central opening therein; of a friction post outside of said cage; means for detachably securing the post to said end wall of the cage having the opening therein; main spring means within the cage; a follower for said spring means; friction shoes cooperable with said post; means for transferring pressure from said shoes to said follower through the opening in said end wall; a follower cage; wedges within said follower cage; and anti-friction rollers between said wedges and the shoes.

In witness that I claim the foregoing I have hereunto subscribed my name this 18th day of May, 1920.

GOODRICH Q. LEWIS.

Witness:
CARRIE GAILING.